2,925,701

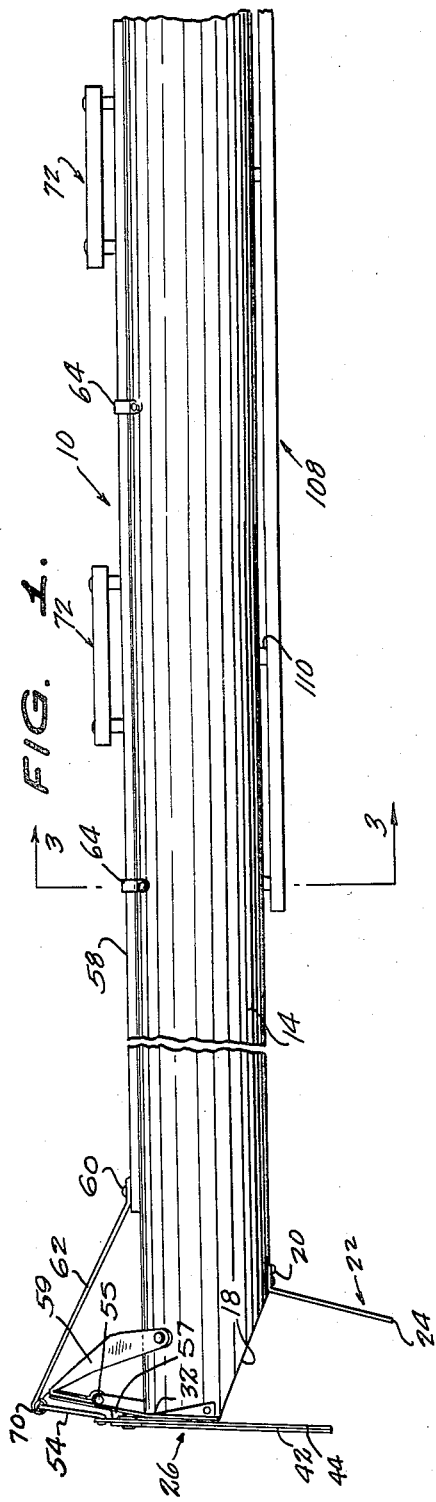
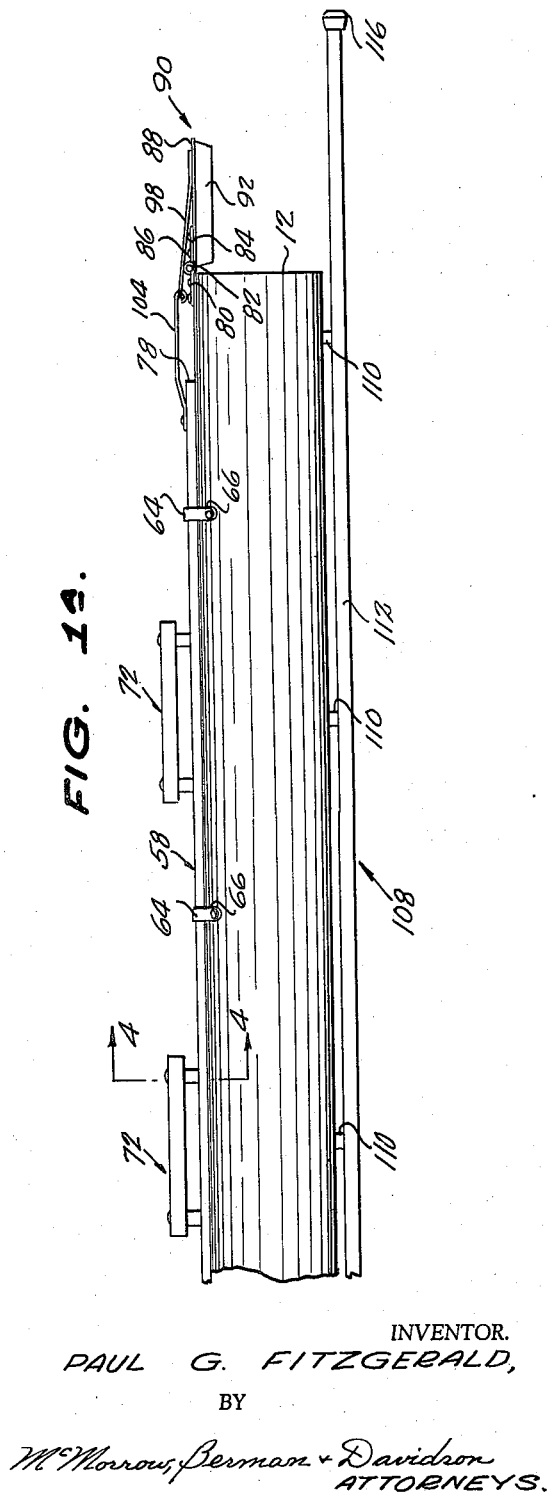

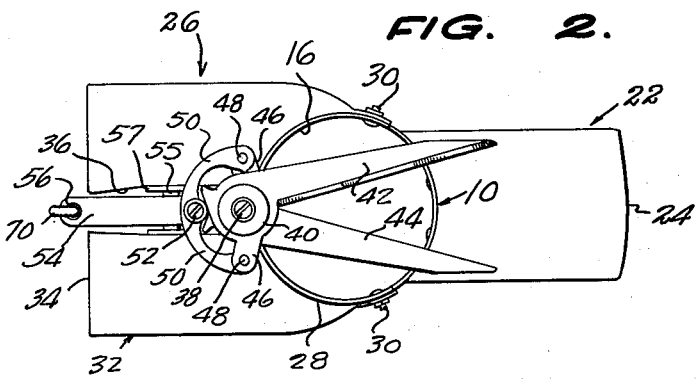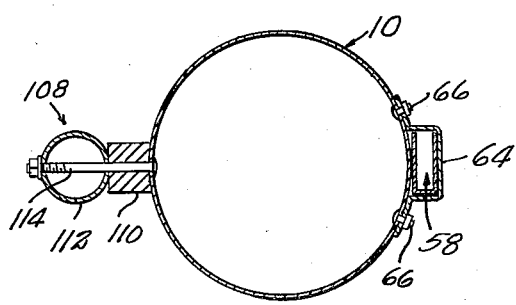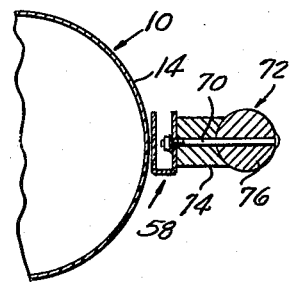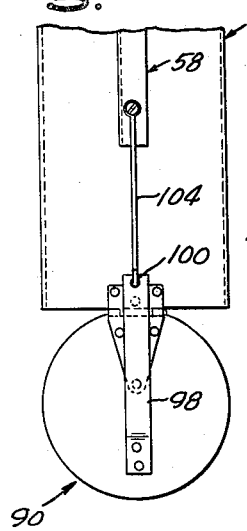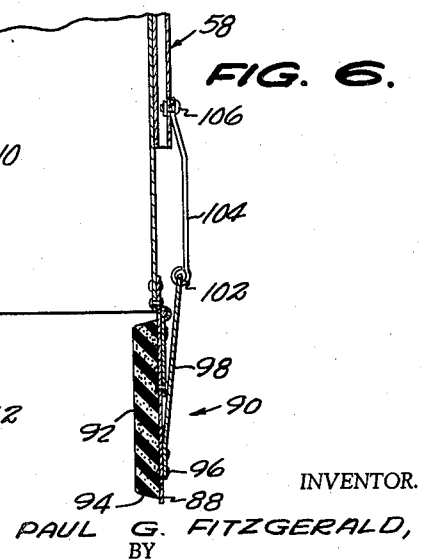
INVENTOR.
PAUL G. FITZGERALD,
BY McMorrow, Berman & Davidson
ATTORNEYS United States Patent Office 2,925,701
Patented Feb. 23, 1960

FRUIT HARVESTER WITH PIVOTED KNIVES

Paul G. Fitzgerald, Greeneville, Tenn.

Application April 11, 1958, Serial No. 727,810

3 Claims. (Cl. 56—336)

This invention relates to improvements in fruit pickers, and more particularly to an improved fruit picker, especially but not exclusively, for picking oranges from trees by either clipping or pulling the oranges therefrom.

The primary object of the invention is to provide a more efficient and more easily operated and manipulated fruit picker of this kind which involves a conveyor tube having fruit clipping and pulling means on one end, and a cushioned fruit retarder on its other end which prevents injury to thin-skinned fruit falling through the tube, and is operated to closed fruit-retarding position by operation of the clipping and pulling means, and to open fruit-discharging position, by operation of the clipping and pulling means to open position.

Another object of the invention is to provide a device of the character indicated, which comprises a fruit-receiving chute or scoop on the forward end of its conveyor tube, and clipping and pulling means on the scoop, in conjunction with a fruit guide and holder on the scoop for holding and guiding fruit on a tree relative to the clipping and pulling means and the scoop, whereby easier and more accurate clipping or pulling of fruit is facilitated and the device can be more efficiently and rapidly manipulated with less effort and skill on the part of an operator of the device, and so that larger quantities of fruit can be picked in less time.

A further object of the invention is to provide a simple and rugged device of the character indicated above, which, with the exceptions of the clipping and pulling means, and the cushion of the retarder, can be constructed throughout of light-weight metal, such as aluminum, at relatively low cost.

Other important objects and advantageous features of the invention will be apparent from the following description, and the accompanying drawings, wherein, for purposes of illustration only, a specific form of the invention is set forth in detail.

In the drawings:

Figures 1 and 1a are side elevations of forward and rear portions, respectively, of a device of the invention, the fruit retarder being shown in open position;

Figure 2 is an enlarged front end elevation of the device, showing the clipping and pulling means in open position;

Figure 3 is an enlarged transverse vertical section taken on the line 3—3 of Figure 1;

Figure 4 is an enlarged fragmentary transverse vertical section taken on the line 4—4 of Figure 1a;

Figure 5 is an enlarged fragmentary top plan view of the right-hand part of Figure 1a; and Figure 6 is a fragmentary vertical longitudinal section taken through the right-hand part of Figure 1a.

Referring in detail to the drawings, wherein like numerals designate like parts throughout the several views, the illustrated device comprises an elongated straight and preferably cylindrical fruit conveyor tube 10 having a squared open rear end 12, and having its side wall 14 taper-cut at one side from a point back of its open forward end 16, so as to define a fruit-receiving opening 18, facing the cut-away side of the tube 10 and serving as a scoop or chute.

Fixed, as indicated at 20, at its rearward end on the tube side wall 14 just behind the opening 18 and extending laterally outwardly and forwardly from the tube 10 and partially over the fruit-receiving opening 18, is a fruit pusher and holder plate 22, which, as shown in Figure 2, is slightly narrower than the tube 10, and has a slightly curved laterally outward end edge 24.

A fruit clipping or pulling assembly, generally designated 26, is mounted on the open forward end 16 of the tube 10, and comprises a three-quarter circular ring 28, encircling the end 16, which is itself three-quarter circular because of the fruit receiving opening 18 cut therefrom, and the ring 28 is secured in place, as by bolts or rivets 30, traversing the ends of the ring 28 and the side wall 14 of the tube 10. Preferably integrally secured to the closed side of the ring 28 and extending laterally therefrom and reaching laterally outwardly from the tube 10 on the side thereof remote from the front pusher and holder plate 22, is a flat mounting plate 32, which is wider than the tube 10 and has a squared outer end edge 34 having a centralized longitudinal slot 36 therein, reaching inwardly from its outer edge 34.

In overlapping relation to each other on a common pivot bolt 38 extending forwardly from the mounting plate 32 at the upper end of the slot 36, are discs 40 on the upper ends of shear blades 42 and 44, which extend centrally across and parallel to the forward end 16 of the tube 10 and reach beyond the lower side of the tube 10 on which the pusher and holder plate 22 is located, as shown in Figures 1 and 2. The discs 40 have laterally outwardly projecting lugs 46 thereon, to whose outer ends are pivoted, as indicated at 48, the adjacent ends of arcuate links 50, which are loosely pivoted together at their other ends, on a common pivot 52, which is fixed on the lower end of a vertically extending bar 54 having a hole 56 in its upper end. The bar 54, as shown in Figure 2, is registered with the slot 36 in the guide plate 32, and is pivoted intermediate its ends at 55 on and between lugs 57 on the plate 32 at opposite sides of the slot 36. Braces 59 extend from opposite sides of the plate 32 and are secured, as indicated at 61, to opposite sides of the tube side wall 14.

Operating means for the blades 42, 44 comprises an elongated straight rigid slide bar 58 which extends along the upper side of the conveyor tube 10. Fixed, as indicated at 60, on the forward end of the slide rod 58, is the rear end of a forwardly and upwardly inclined rigid rod 62 having a hook 70 on its forward end which is loosely and pivotally engaged in the hole 56 in the upper end of the vertical bar 54. The slide bar 58 is preferably hollow and flat and U-shaped in cross section, as shown in Figures 3 and 4, and is confined in sliding engagement with the upper side of the tube side wall by rectangular U-shaped brackets 64 secured thereto, as indicated at 66, at spaced intervals therealong. Between adjacent brackets 64, the slide bar 58 has fixed on its upper side, as by bolts 70, longitudinal U-shaped handles 72. The handles 72 preferably comprise spacers 74 and longitudinally elongated handle bars 76 overlying the spacers 74, the ends of the handle bars 76 and the spacers being traversed by the bolts 70. The rear end 78 of the slide bar 58 terminates at a point near to and spaced forwardly from the rear end 12 of the conveyor tube 10. When the slide bar 58 is moved rearwardly, by means of a handle 72, the vertical bar 54 is tilted rearwardly and, in effect, moved upwardly, so that the arcuate links 50 are pulled upwardly, so that the lower ends of the links 50 move inwardly and, in so doing, force the blades 42, 49 toward each other into shearing relationship.

In line with the slide bar 58 and secured to the upper side of the conveyor tube 10 is a first hinge leaf 80 terminating in a hinge barrel 82 at the rear end of the tube 10, and a second hinge leaf 84 is connected to the hinge barrel 82 and extends rearwardly therefrom, and is fixed, at 86, to the upper side of a rigid disc 88, which is a component of a fruit retarder, generally designated 90. Secured on the inward side of the disc 88 is a circular, preferably sponge rubber cushion pad 92, whose peripheral edge 94 is tapered, so that the pad 92 can enter the rear end 12 of the conveyor tube 10 in the closed position of the fruit retarder 90.

Fixed at its rear end to the outer side of the retarder disc 88 at the rear edge thereof, as indicated at 96, is a longitudinal strap 98 having a hole 100 in its free forward end, through which is loosely and pivotally engaged a hook 102 on the rear end of a longitudinal link 104 which is fixed at its forward end, as indicated at 106, on the upper side of the slide bar 58 at the rear end thereof. The slide bar 58 and the elements connected thereto are proportioned in length so that, when the slide bar 58 is moved rearwardly, by means of a handle 72, the retarder 90 is swung to its closed position substantially simultaneously with closing of the shearing blades 42 and 44.

Fixed along and to the lower side of the conveyor tube side wall 14 opposite the slide bar 58, is an elongated combined manipulating handle and rest, generally designated 108, which preferably comprises spacers 110 spaced along the tube 10, and a single bar 112, preferably of round cross section, secured to the side wall, as by bolts 114, traversing the spacers 110. The handle bar 112 extends rearwardly beyond the rear end 12 of the conveyor tube 10, and has on its rear end a preferably soft rubber hand knob 116. The handle bar 112 can engage the ground or other support as a rest for the device which keeps the conveyor tube 10 out of contact with the ground or other support. The part of the handle bar 112 extending beyond the rear end of the conveyor tube 10, is arranged to be grasped in one hand of the operator of the device, for manipulating and positioning the device relative to a tree from which fruit is to be pulled or clipped, while the operator uses his other hand for operating the slide bar 58.

In operation, the device is held by the bar 112 and one of the slide bar handles 72, with the guide plate 32 against or near a tree branch from which fruit, such as oranges, are to be clipped or pulled, and the device manipulated so that the plate 32 guides a selected fruit to the clipping and pulling assembly 26 and its blades 42 and 44, with the scoop opening 18 facing the selected fruit. At the same time, the fruit pusher and holder plate 22 can be pushed against selected fruit on the tree so as to push the fruit between the blades 42 and 44 of the clipping and pulling assembly 26. The slide bar 58 is then pulled rearwardly relative to the conveyor tube 10, so as to close the blades 42 and 44 around the stem of the fruit, with sufficient force to shear off the stem or with only sufficient force to grip the stem between the blades 42 and 44. In the latter case the gripped stem is pulled, rather than cut, from a tree branch, by appropriate manipulation of the device. In either case, the picked fruit falls through the scoop opening 18 into and falls through the conveyor tube 10, and falls harmlessly upon the cushion pad 92 of the retarder 90, which was closed by the rearward operation of the slide bar 58. The picked fruit is then released or discharged from the rear end 12 of the conveyor tube 10 by moving the slide bar 58 forwardly. This moves the retarder 90 to its open position, and simultaneously opens the blades 42 and 44, thereby making the device ready for another picking operation.

Although I have shown and described herein a specific form of my invention, it is to be understood that any change or changes in the structure and in the relative arrangements of the components are contemplated as being within the spirit and scope of the invention as defined by the claims appended hereto.

What is claimed is:

1. A fruit picker comprising an elongated rigid conveyor tube having open forward and rear ends, and a side wall, a fruit clipping and pulling assembly mounted on said tube at the forward end thereof and having shearing blades reaching across the forward end of the tube, a longitudinal slide bar mounted on said side wall for endwise movements relative to the tube, said slide bar having forward and rear ends, means operatively connecting the slide bar at its forward end to said shearing blades, operating handle means fixed on the slide bar for operating the same, and conveyor tube handle means fixed on the conveyor tube and spaced around the tube from the operating handle means, a cushioned retarder plate hinged on the tube at the rear end thereof to swing between open and closed positions relative to the open rear end of the tube, and means operatively connecting the slide bar to said retarder plate so that the retarder plate is moved to closed position as the slide bar is moved endwise in a direction to close the shearing blades and is moved to open position as the slide bar is moved in the opposite direction to open the shearing blades.

2. A fruit picker comprising an elongated rigid conveyor tube having open forward and rear ends, and a side wall, a fruit clipping and pulling assembly mounted on said tube at the forward end thereof and having shearing blades reaching across the forward end of the tube, a longitudinal slide bar mounted on said side wall for endwise movements relative to the tube, said slide bar having forward and rear ends, means operatively connecting the slide bar at its forward end to said shearing blades, operating handle means fixed on the slide bar for operating the same, and conveyor tube handle means fixed on the conveyor tube and spaced around the tube from the operating handle means, a cushioned retarder plate hinged on the tube at the rear end thereof to swing between open and closed positions relative to the open rear end of the tube, and means operatively connecting the slide bar to said retarder plate so that the retarder plate is moved to closed position as the slide bar is moved endwise in a direction to close the shearing blades and is moved to open position as the slide bar is moved in the opposite direction to open the shearing blades, said conveyor tube having a fruit receiving opening in the side of its side wall remote from said slide bar, said fruit receiving opening reaching forwardly to and entering the open forward end of the conveyor tube, and a fruit pushing and holding plate fixed to and projecting laterally from the tube side wall at a point behind and in line with said fruit receiving opening.

3. A fruit picker comprising an elongated rigid conveyor tube having open forward and rear ends, and a side wall, a fruit clipping and pulling assembly mounted on said tube at the forward end thereof and having shearing blades reaching across the forward end of the tube, a longitudinal slide bar mounted on said side wall for endwise movements relative to the tube, said slide bar having forward and rear ends, means operatively connecting the slide bar at its forward end to said shearing blades, operating handle means fixed on the slide bar for operating the same, and conveyor tube handle means fixed on the conveyor tube and spaced around the tube from the operating handle means, a cushioned retarder plate hinged on the tube at the rear end thereof to swing between open and closed positions relative to the open rear end of the tube, and means operatively connecting the slide bar to said retarder plate so that the retarder plate is moved to closed position as the slide bar is moved endwise in a direction to close the shearing blades and is moved to open position as the slide bar is moved in the opposite direction to open the shearing blades, said conveyor tube having a fruit receiving opening in the side of its side wall remote from said slide bar, said fruit receiving opening reaching forwardly to and entering the open forward end of the conveyor tube, and a fruit pushing and holding plate fixed to and projecting laterally from the tube side wall at a point behind and in line with said fruit receiving opening, a mounting plate fixed on and projecting laterally from the side of the tube side wall remote from said fruit receiving opening, said fruit clipping and pulling assembly being mounted on said mounting plate.

References Cited in the file of this patent

UNITED STATES PATENTS

| | | |
|---|---|---|
| 1,061,138 | Stoddard | May 6, 1913 |
| 2,746,232 | Ossino | May 22, 1956 |